July 21, 1942.    F. G. HENRY    2,290,747
SPOUT CONSTRUCTION FOR COFFEE MILLS AND THE LIKE
Filed Nov. 2, 1939    2 Sheets-Sheet 1

Inventor:
Ferdinand G. Henry
by his Attorneys
Howson & Howson

July 21, 1942.    F. G. HENRY    2,290,747
SPOUT CONSTRUCTION FOR COFFEE MILLS AND THE LIKE
Filed Nov. 2, 1939    2 Sheets—Sheet 2

Inventor:
Ferdinand G. Henry
by his Attorneys
Howson & Howson

Patented July 21, 1942

2,290,747

UNITED STATES PATENT OFFICE 2,290,747

SPOUT CONSTRUCTION FOR COFFEE MILLS AND THE LIKE

Ferdinand G. Henry, Philadelphia, Pa., assignor to The Enterprise Manufacturing Company of Pennsylvania, Philadelphia, Pa., a corporation of Pennsylvania Application November 2, 1939, Serial No. 302,611

3 Claims. (Cl. 226—58)

This invention relates to coffee mills and, more particularly, to outlet spouts therefor, and has for an important object thereof the elimination of the many annoying characteristics of the present outlet spout constructions.

In commercial coffee mills, and particularly in commercial coffee mills of the side outlet type, the coffee is delivered from the grinding chamber by being forced outwardly between the burrs and then through the spout, the delivery of the last few grains being attempted by providing a movable burr with vanes creating a current of air through the spout. Obviously, where coffee is being forced through the spout it will tend to spill from the spout rapidly and spurt if it is not deflected into the receptacle in some manner, and for this reason these spouts are usually provided with a deflecting gate to prevent this spurting action. The gate likewise performs a second function, that of preventing accumulation of dust and other foreign matter in the mouth of the spout. However, in the usual construction the gate, closing by gravity, tends to retain within the spout the last few grains of coffee which have no pressure behind them other than the relatively light current of air produced by the usual propelling vanes and, accordingly, the gate closes prior to completion of the discharge of the coffee from the spout, thus retaining in the spout, portions of the coffee from the last grinding and delivering it with the initial coffee of the next grind. Obviously, where the type of grind desired is changed, the following customer receives a small portion of coffee which is improperly ground and in event the last grinding had occurred, for example, at closing time prior to a holiday, this coffee, even if of the same grind, will be stale.

An important object of the present invention is the provision of a structure whereby an increased draft is provided through the outlet spout to deliver the final grains therethrough.

Another object of the invention is the provision of a gate construction such that the gate may not close until the receptacle for the ground coffee has been removed from the spout.

A more specific object of the invention is the provision of a means for latching the gate in open position which is normally inoperative but which is rendered operative as soon as the receptacle is placed beneath the spout and acts to latch the gate in its open position as soon as it is opened by the pressure of coffee thereagainst.

Another objection to the usual gate construction is that the coffee, due to its tendency to spread at the mouth of the spout as it leaves the same, tends to jam beneath the gate and thus hold the gate in open position. Obviously, in the latter event there will be a constant dribble of coffee grains from the spout which renders the adjacent portions of the counter unsightly. Accordingly, a further object of the present invention is the provision of means for preventing jamming of the coffee grains in a manner holding the gate in open position.

These and other objects I attain by the construction shown in the accompanying drawings wherein, for the purpose of illustration, I have shown a preferred embodiment of my invention and wherein.

Figure 1:
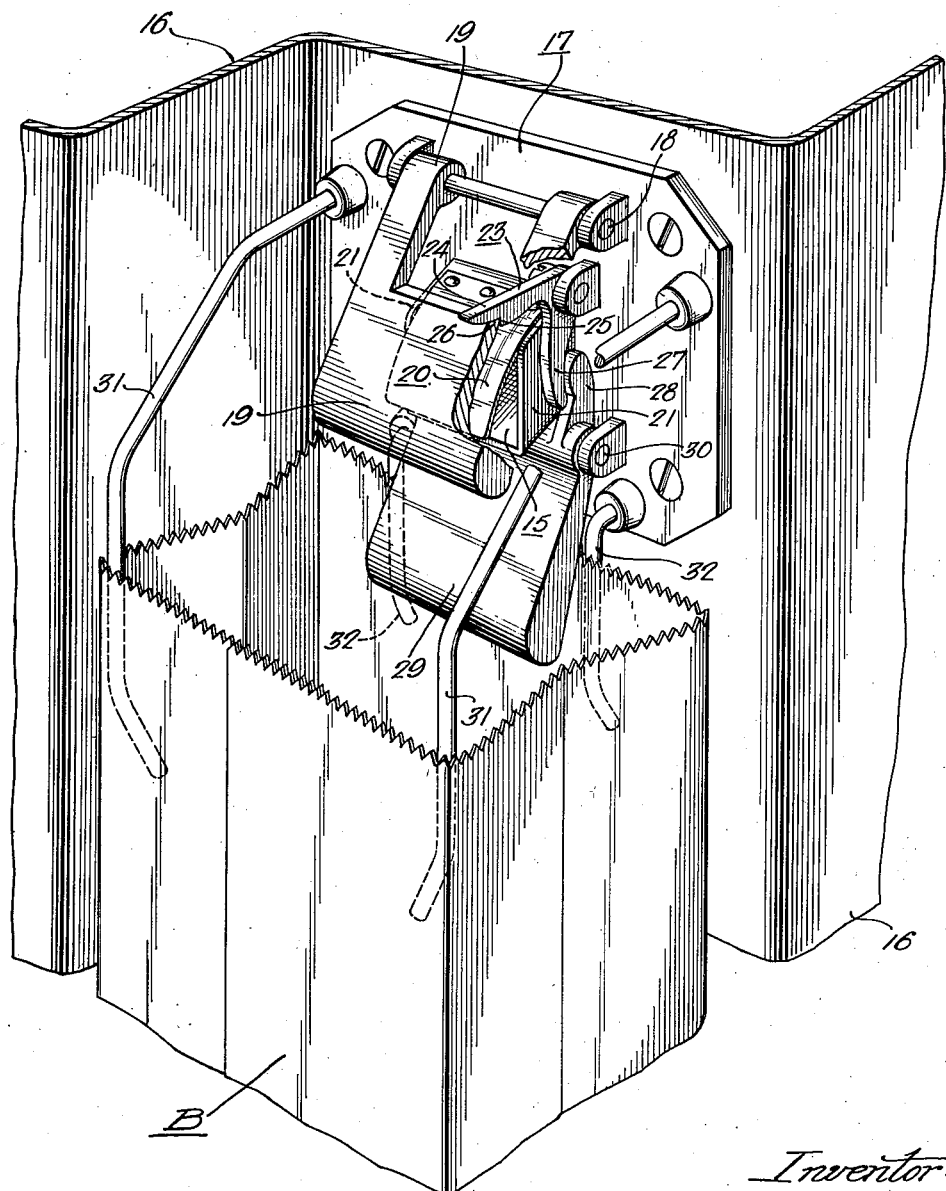
Fig. 1 is a fragmentary perspective showing the outlet end of a coffee mill equipped with a control gate constructed in accordance with my invention.
Figure 2:
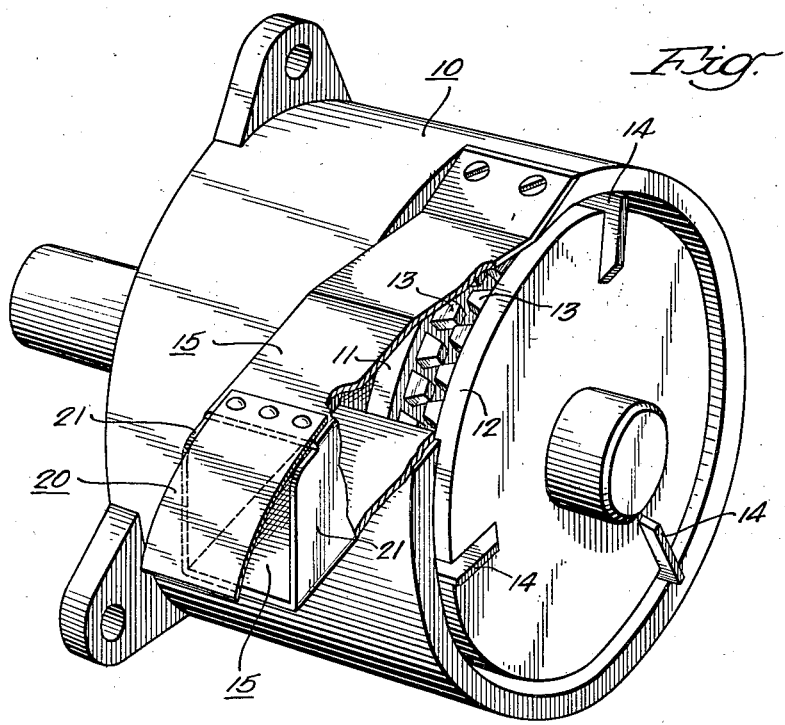
Fig. 2 is a fragmentary perspective showing the grinding burrs and the spout construction.
Figure 3:
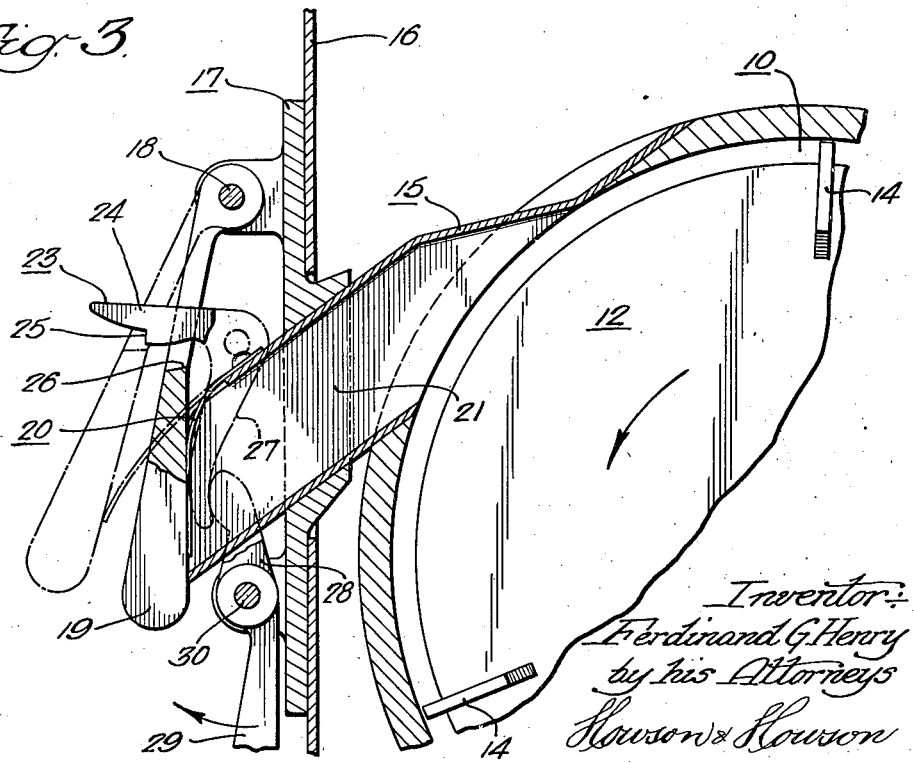
Fig. 3 is a vertical sectional view through the discharge spout and controlling gate.

Referring now more particularly to the drawings, the numeral 10 indicates the grinding chamber of a coffee mill having arranged therein relatively rotatable grinding burrs 11 and 12, of which the burr 12 is provided, in addition to the grinding teeth or lugs 13, with propelling vanes 14 for creating a current of air through the spout 15. This spout, in accordance with my invention, is arranged tangentially to the grinding chamber so that the outlet corresponds to that of an ordinary blower fan and the propelling blades 14 may create an increased velocity through the spout. Such mills are usually encased, as indicated at 16, and under these circumstances the outer end of the spout is directed through and supported by a supporting plate 17 secured to the casing wall at the outer surface thereof, it being understood, however, that where the mill is not encased other suitable supporting means for the spout may be provided.

Pivoted to the support 17 above the mouth of the spout at 18 is a gate 19 at present disclosed as closing by gravity to seal the mouth of the spout 15 although other means for closing the gate may be provided as desired. This gate, under the pressure of coffee ejected between the burrs will be opened to permit the coffee to pass from the spout and I prefer that the upper wall of the spout be provided with a flexible reed 20 which comprises the outer end of such upper wall and may be flexed downwardly between the side walls 21 by the gate 19 when closing. This reed which will bend arcuately, as illustrated, prevents coffee from moving upwardly and packing between the gate support and gate to prevent the gate from closing, and of itself comprises a valuable modification of the normal type of gate structure.

The support 17 has pivoted thereto a latch 23 shown as comprising a bell crank lever one arm 24 of which has a shoulder 25 adapted to engage a coacting shoulder 26 on gate 19 to hold the gate in its open position. A second arm 27 of this lever is shown as depending and arranged in juxtaposition to an upstanding finger 28 formed on a tripping lever 29 which is centrally pivoted at 30 to the support 17. The weight of the lower end of the lever 29 is sufficient to move the latch 23 and release the shoulders 25 and 26, permitting gate 19 to close. Bag guides are provided to hold the mouth of the bag in proper position beneath the spout. These guides include outer guides 31 adapted to enter the mouth of the bag at the outer side thereof and inner guides 32 which guide the inner side wall of the bag B upwardly to engage beneath the lever 29 and elevate the same so that the engagement between the finger 28 and arm 27 is released, permitting the latch to assume its operative position. As soon, however, as the bag is withdrawn, the tripping lever swings about its pivot re-engaging finger 28 and arm 27 and releasing the latch.

In operation of the apparatus it will be obvious that the discharged material from the grinding burrs will create pressure against the valve or gate 19, which will open the same permitting the material to pass to the receptacle B which has previously been placed in the position shown in Figure 1. When the gate has opened to a predetermined extent, the latch 23 will engage the same to hold it open, and the gate will remain open not only during the entire grinding operation, including the final stages thereof, but after the completion thereof until such time as the receptacle B is removed, thereby permitting the spout to be cleared as it will be, by the increased air current resulting from the new arrangement of spout 15 with relation to grinding chamber 10. When, however, the bag is released, the instantaneous closure of gate 19 which will occur before the bag can be completely removed from beneath the spout will prevent any loose grains from falling to the counter or bag support below (not herein shown).

Since the arrangement illustrated is, obviously, but one of many which may be resorted to within the scope of my invention, I do not wish to be understood as confining myself thereto except as hereinafter claimed.

I claim:

1. In a discharge for apparatus of the type described, an outlet spout, a valve for the outlet spout opening only in response to pressure within the spout, a lever adapted to operatively engage the valve and hold the same in open position after opening thereof, and normally operative means for engaging said lever to disengage it from the valve, said means being rendered inoperative by receptive positioning of a receptacle at the spout.

2. An outlet spout having a pivoted valve to close the outer end thereof, said valve being pivoted adjacent one wall of the spout and a flexible reed comprising a continuation of the inner surface of said wall of the spout, said reed engaging said valve in all positions and being constructed and arranged to prevent material passing from the spout from accumulating about the pivotal connection of the valve.

3. An outlet spout having a pivoted valve to close the outer end thereof, said valve being pivoted adjacent one wall of the spout, and a flat resilient strip secured to and forming a continuation of the inner surface of said wall of the spout and of substantially the same width thereas, said strip having its free end in engagement with said valve.

FERDINAND G. HENRY.